United States Patent
Kadous et al.

(10) Patent No.: US 8,897,220 B2
(45) Date of Patent: Nov. 25, 2014

(54) MULTI-RADIO COEXISTENCE

(75) Inventors: Tamer Adel Kadous, San Diego, CA (US); Pranav Dayal, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/237,107

(22) Filed: Sep. 20, 2011

(65) Prior Publication Data

US 2012/0243473 A1 Sep. 27, 2012

Related U.S. Application Data

(60) Provisional application No. 61/385,366, filed on Sep. 22, 2010, provisional application No. 61/389,643, filed on Oct. 4, 2010.

(51) Int. Cl.
| | |
|---|---|
| *H04W 48/02* | (2009.01) |
| *H04W 48/18* | (2009.01) |
| *H04W 72/12* | (2009.01) |

(52) U.S. Cl.
CPC .................. *H04W 72/1215* (2013.01)
USPC .................. 370/328; 455/41.2; 370/338

(58) Field of Classification Search
USPC ......... 370/328–339, 343, 344, 347, 348–480; 455/442, 423, 425, 450–454, 448
IPC ....... H04W 72/1215,48/02, 48/18; H04L 29/06; H04B 1/40, 1/713
See application file for complete search history.

(56) References Cited

U.S. PATENT DOCUMENTS

| | | | | |
|---|---|---|---|---|
| 8,295,259 | B1* | 10/2012 | Bagchi | 370/338 |
| 2006/0205401 | A1* | 9/2006 | Palin et al. | 455/425 |
| 2007/0111790 | A1* | 5/2007 | Maekawa et al. | 463/40 |
| 2008/0057967 | A1* | 3/2008 | Goldsmith | 455/447 |
| 2008/0232315 | A1* | 9/2008 | Bachl et al. | 370/329 |
| 2008/0233875 | A1 | 9/2008 | Desai et al. | |
| 2009/0017756 | A1* | 1/2009 | Tsfaty et al. | 455/41.2 |

(Continued)

FOREIGN PATENT DOCUMENTS

| | | |
|---|---|---|
| JP | 2007143155 A | 6/2007 |
| WO | WO2006080464 A1 | 8/2006 |

OTHER PUBLICATIONS

International Search Report and Written Opinion—PCT/US2011/052567—ISA/EPO—Dec. 1, 2011.

(Continued)

*Primary Examiner* — Andrew Chriss
*Assistant Examiner* — John Lequang
(74) *Attorney, Agent, or Firm* — Seyfarth Shaw LLP

(57) ABSTRACT

A method of wireless communication includes determining denial rates for first and second communication attempts of a packet using a first communication resource (e.g., an LTE radio). The method also includes allowing a second communication resource (e.g., a Bluetooth radio) to communicate when communication attempts from the first communication resource are denied. The denial rates are chosen to achieve threshold levels of performance for the first and second communication resources. The second denial rate may be set and the first denial rate adjusted in a looped manner to achieve desired Bluetooth performance. The denial rates may be set to deny all first communication attempts but to allow all second communication attempts. Final attempts to transmit Bluetooth packets may be given priority regardless of the first and second denial rates.

22 Claims, 12 Drawing Sheets

(56) References Cited

U.S. PATENT DOCUMENTS

| | | | |
|---|---|---|---|
| 2009/0129367 A1* | 5/2009 | Bitran | 370/350 |
| 2009/0201862 A1* | 8/2009 | Okker et al. | 370/329 |
| 2009/0304047 A1* | 12/2009 | Hulbert et al. | 375/144 |
| 2010/0008338 A1* | 1/2010 | Tsfati et al. | 370/338 |
| 2010/0019584 A1 | 1/2010 | Vercelli et al. | |
| 2010/0195584 A1* | 8/2010 | Wilhelmsson et al. | 370/329 |
| 2010/0202416 A1 | 8/2010 | Wilhelmsson et al. | |
| 2010/0265856 A1* | 10/2010 | Yang | 370/281 |
| 2010/0317289 A1* | 12/2010 | Desai et al. | 455/41.2 |

OTHER PUBLICATIONS

Yang et al., "Bluetooth Coexistence with 4G Broadband Wireless Networks," 2010 7th Annual IEEE Communications Society Conference on Sensor, Mesh and Ad Hoc Communications and Networks (SECON), pp. 3-6, (Jun. 2010).

* cited by examiner

MULTI-RADIO COEXISTENCE

CROSS REFERENCE TO RELATED APPLICATION

This application claims the benefit of U.S. Provisional Patent Application No. 61/385,366 entitled "METHOD AND APPARATUS TO FACILITATE SUPPORT FOR MULTI-RADIO COEXISTENCE," filed Sep. 22, 2010, and U.S. Provisional Patent Application No. 61/389,643 entitled "METHOD AND APPARATUS TO FACILITATE SUPPORT FOR MULTI-RADIO COEXISTENCE," filed Oct. 4, 2010, the disclosures of which are expressly incorporated herein by reference in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

Offered is a method for wireless communication. The method includes determining a first denial rate for denying first communication attempts of a packet using a first communication resource. The method also includes determining a second denial rate for denying second communication attempts of the packet using the first communication resource. The method further includes allowing a second communication resource to communicate when communication attempts from the first communication resource are denied. The first denial rate and second denial rate are determined to achieve a first threshold level of performance of the first communication resource and a second threshold level of performance of the second communication resource.

Offered is a method for wireless communication. The method includes determining a denial rate for denying first communication attempts of a packet using a first communication resource. The method also includes allowing a second communication resource to communicate when communication attempts from the first communication resource are denied. The method further includes choosing the denial rate to achieve less than a first threshold level of performance of the first communication resource and greater than a second threshold level of performance of the second communication resource.

Offered is an apparatus for wireless communications. The apparatus includes means for determining a first denial rate for denying first communication attempts of a packet using a first communication resource. The apparatus also includes means for determining a second denial rate for denying second communication attempts of the packet using the first communication resource. The apparatus further includes means for allowing a second communication resource to communicate when communication attempts from the first communication resource are denied. The first denial rate and second denial rate are determined to achieve a first threshold level of performance of the first communication resource and a second threshold level of performance of the second communication resource.

Offered is an apparatus for wireless communications. The apparatus includes means for determining a denial rate for denying first communication attempts of a packet using a first communication resource. The apparatus also includes means for allowing a second communication resource to communicate when communication attempts from the first communication resource are denied. The apparatus further includes means for choosing the denial rate to achieve less than a first threshold level of performance of the first communication resource and greater than a second threshold level of performance of the second communication resource.

Offered is a computer program product configured for wireless communication. The computer program product includes a non-transitory computer-readable medium having non-transitory program code recorded thereon. The program code includes program code to determine a first denial rate for denying first communication attempts of a packet using a first communication resource. The program code further includes program code to determine a second denial rate for denying second communication attempts of the packet using the first communication resource. The program code further includes program code to allow a second communication resource to communicate when communication attempts from the first communication resource are denied. The first denial rate and second denial rate are determined to achieve a first threshold level of performance of the first communication resource and a second threshold level of performance of the second communication resource.

Offered is a computer program product configured for wireless communication. The computer program product includes a non-transitory computer-readable medium having non-transitory program code recorded thereon. The program code includes program code to determine a denial rate for denying first communication attempts of a packet using a first communication resource. The program code also includes program code to allow a second communication resource to communicate when communication attempts from the first communication resource are denied. The program code further includes program code to choose the denial rate to achieve less than a first threshold level of performance of the first communication resource and greater than a second threshold level of performance of the second communication resource.

Offered is an apparatus for wireless communication. The apparatus includes a memory and a processor(s) coupled to the memory. The processor(s) is configured to determine a first denial rate for denying first communication attempts of a packet using a first communication resource. The processor(s) is also configured to determine a second denial rate for denying second communication attempts of the packet using the first communication resource. The processor(s) is further configured to allow a second communication resource to communicate when communication attempts from the first communication resource are denied. The first denial rate and second denial rate are determined to achieve a first threshold level of performance of the first communication resource and a second threshold level of performance of the second communication resource.

Offered is an apparatus for wireless communication. The apparatus includes a memory and a processor(s) coupled to the memory. The processor(s) is configured to determine a denial rate for denying first communication attempts of a packet using a first communication resource. The processor(s) is also configured to allow a second communication resource to communicate when communication attempts from the first communication resource are denied. The processor(s) is further configured to choose the denial rate to achieve less than a first threshold level of performance of the first communication resource and greater than a second threshold level of performance of the second communication resource.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
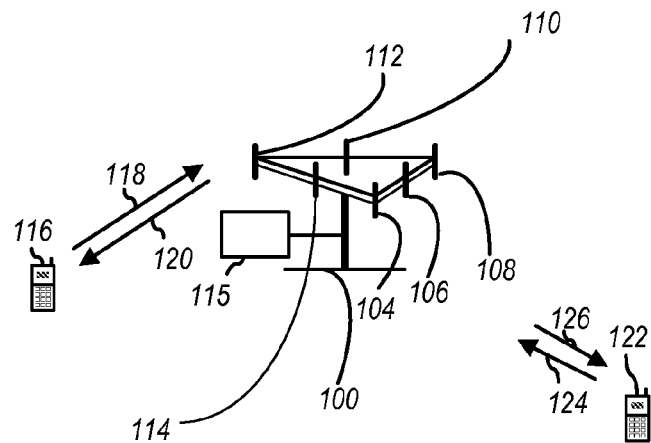
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over a downlink (DL) 120 and receive information from the UE 116 over an uplink (UL) 118. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
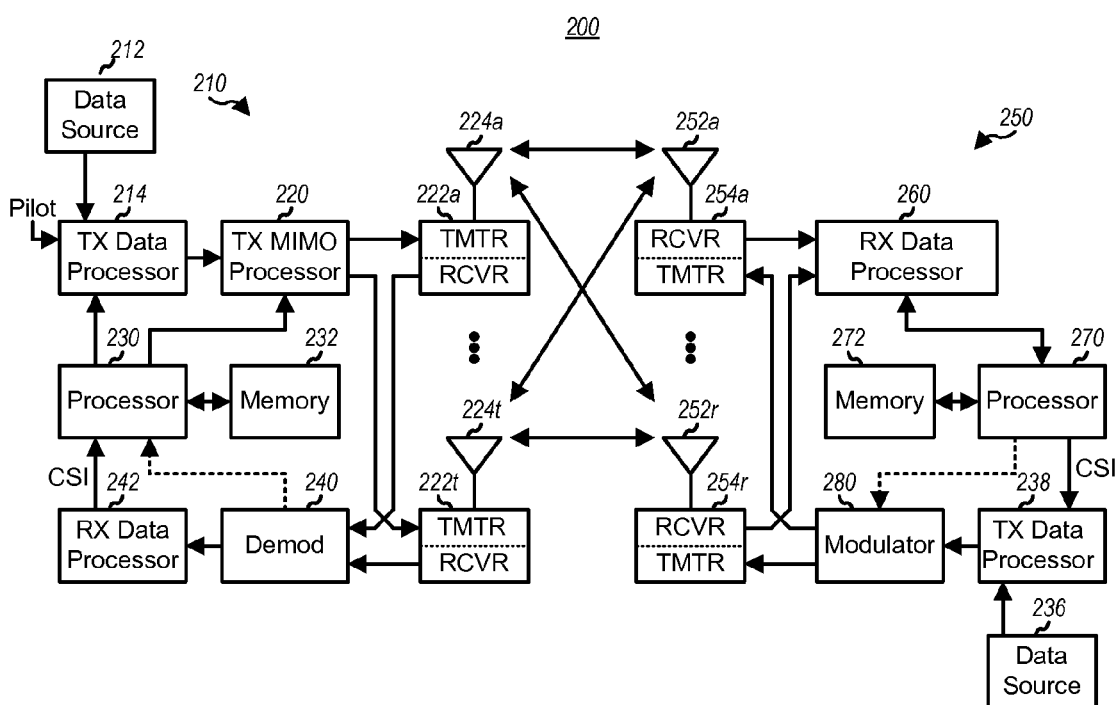
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
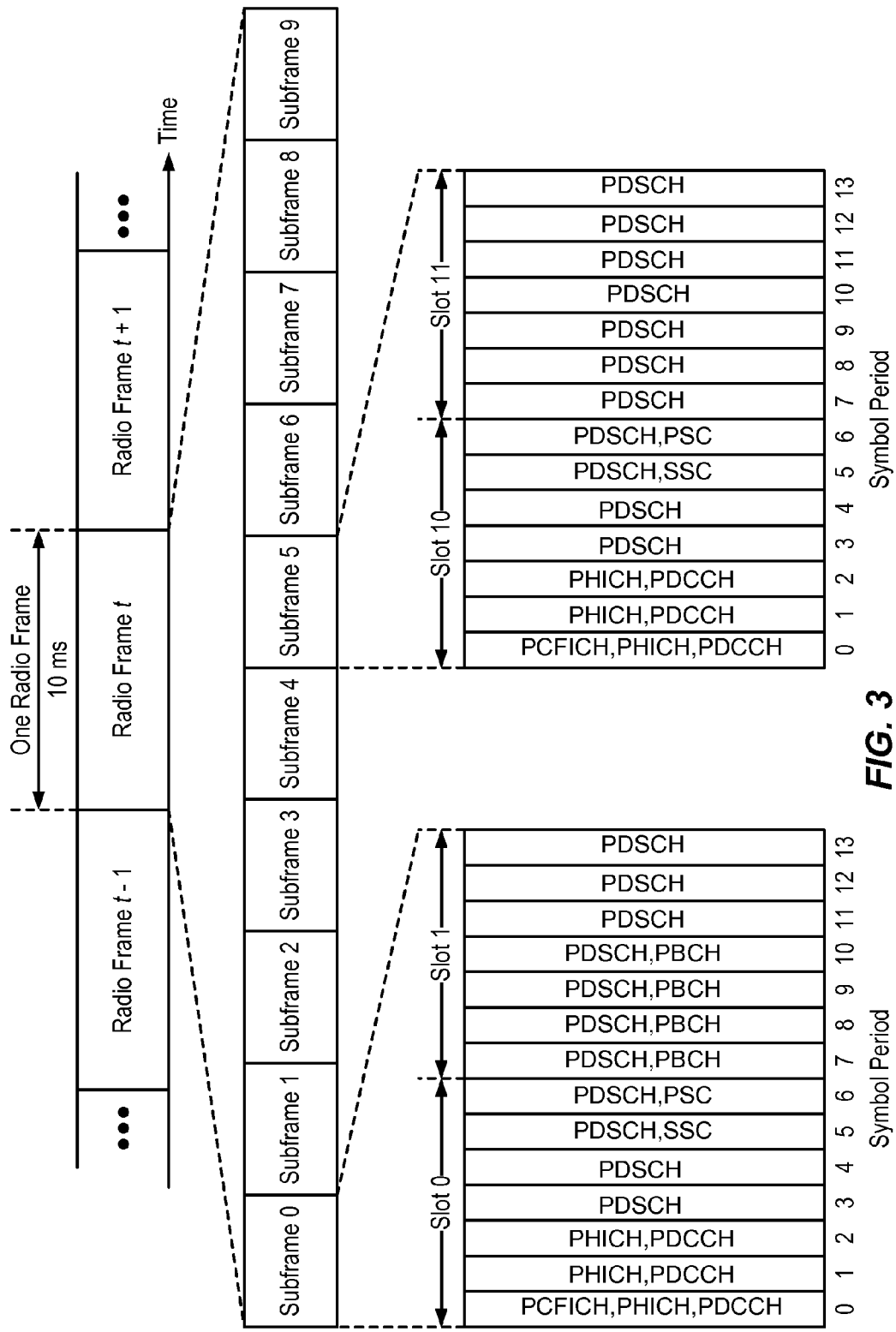
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
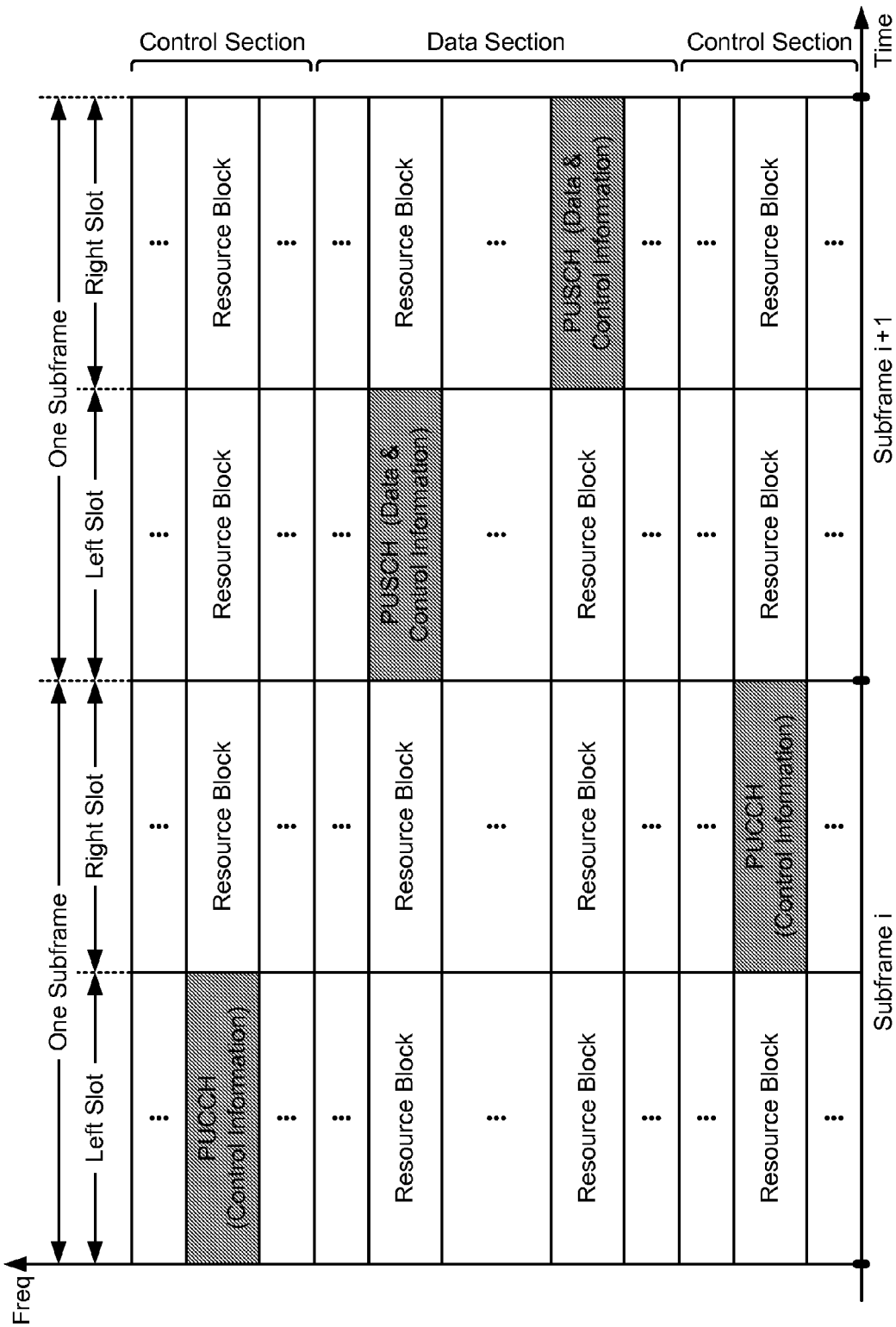
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
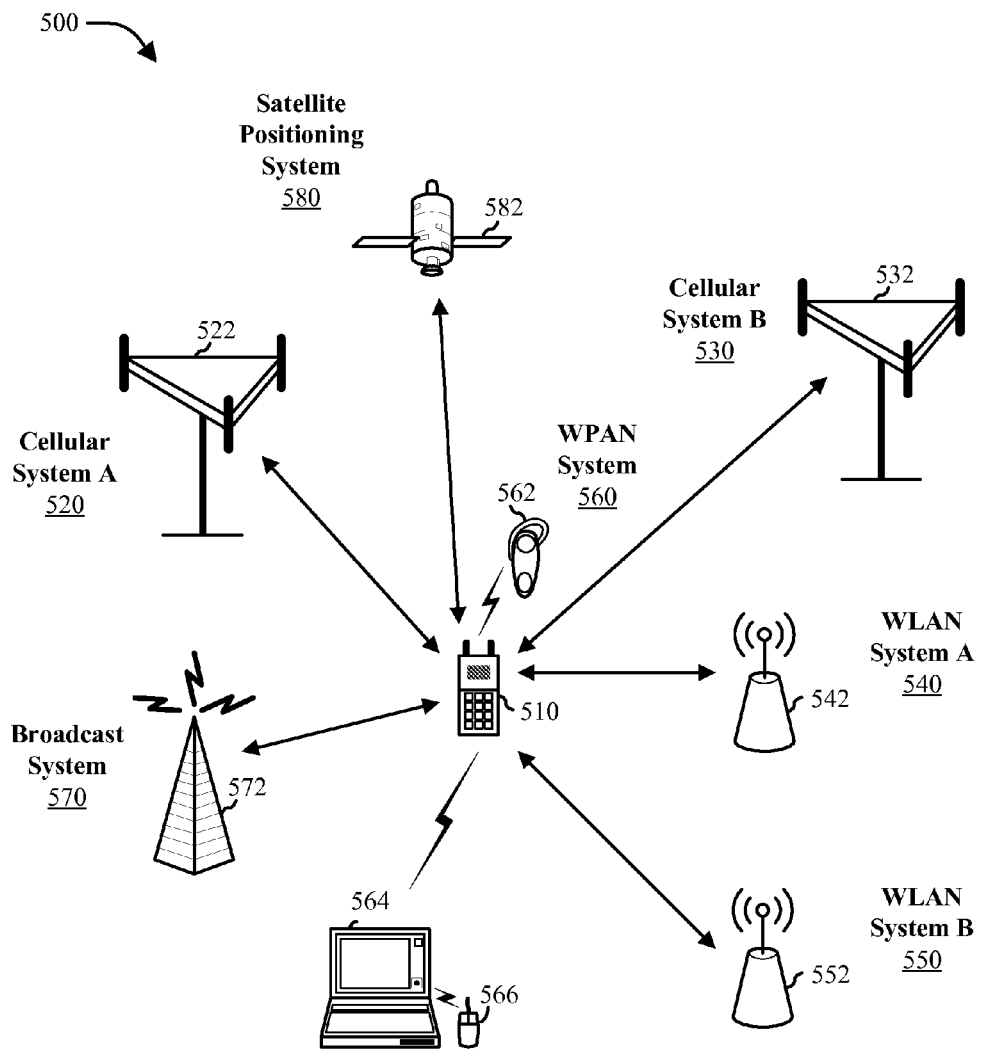
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
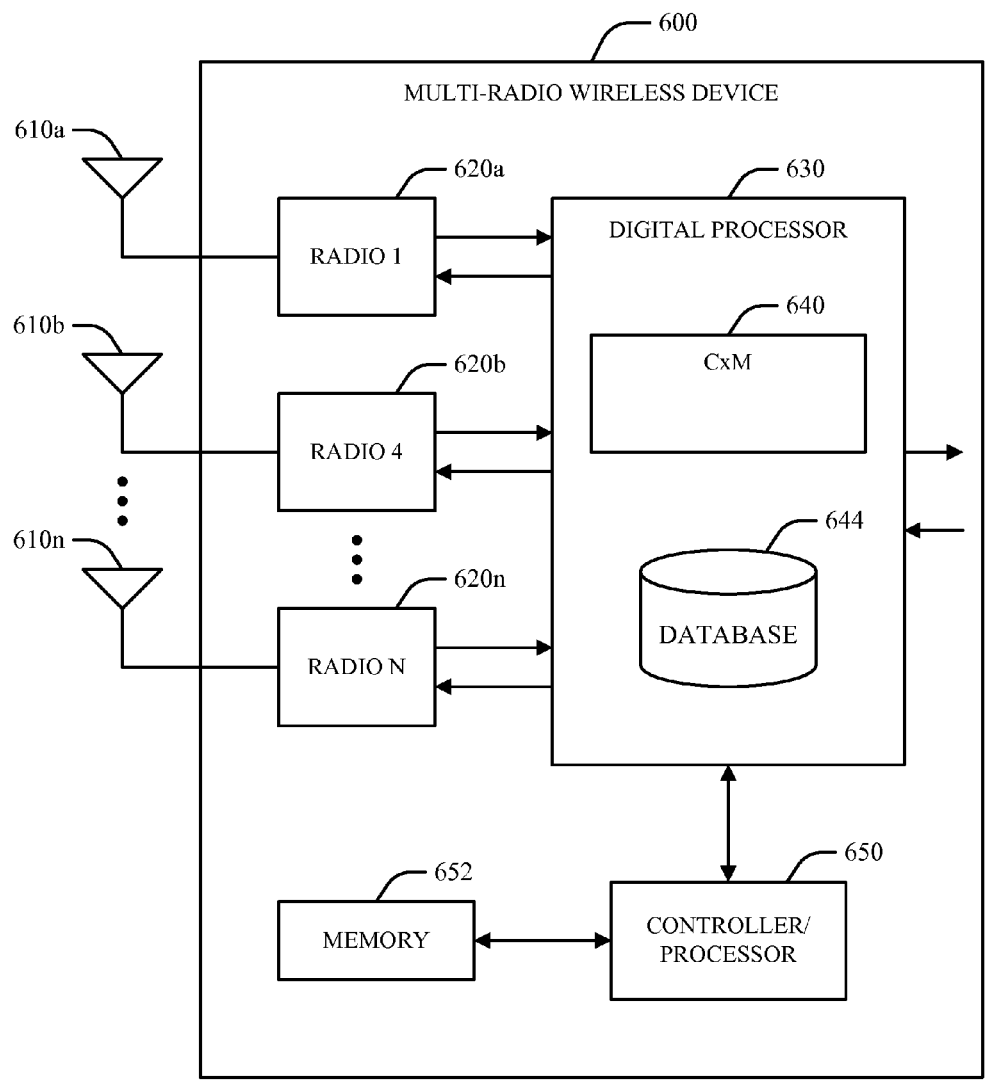
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
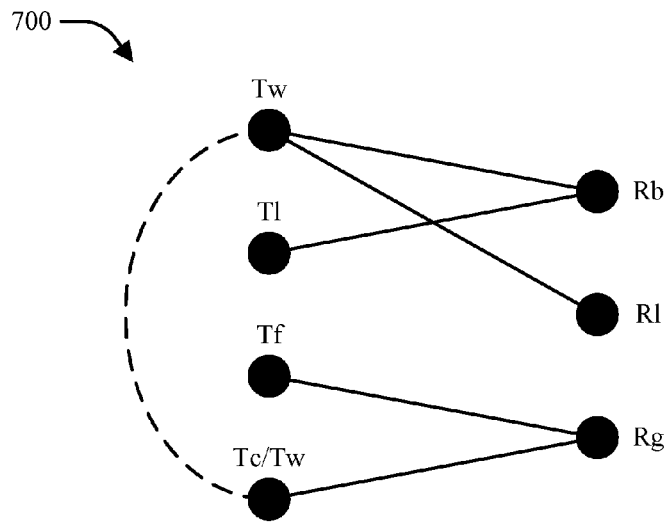
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIGS. 11 and 12. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
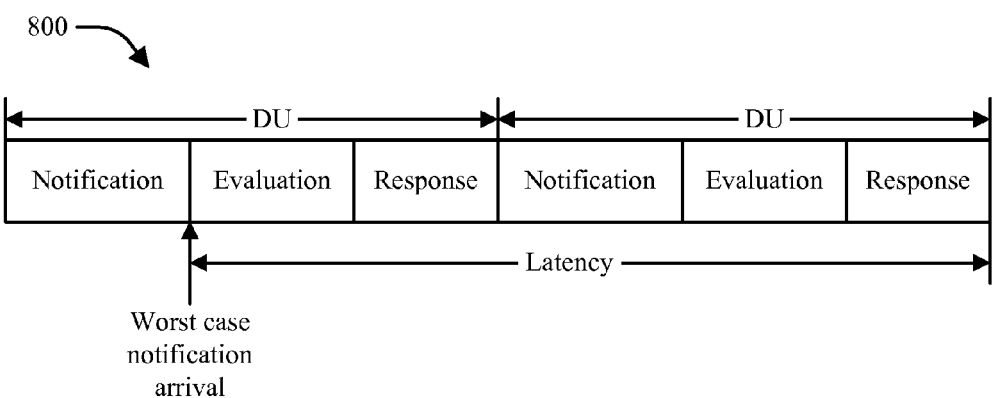
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
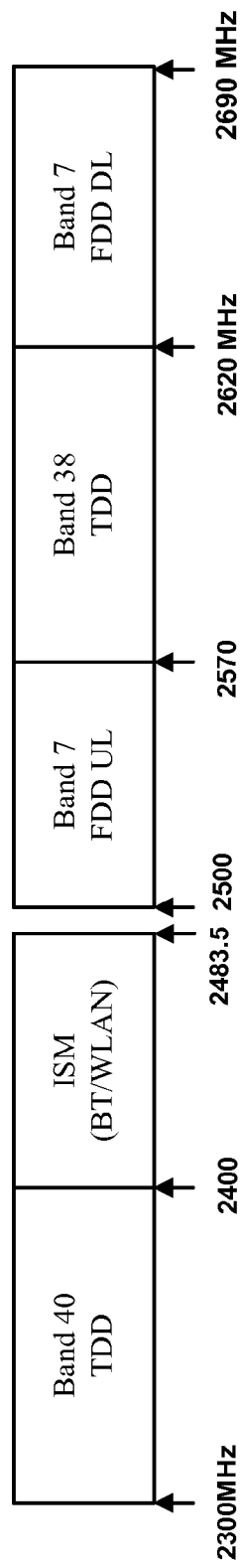
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
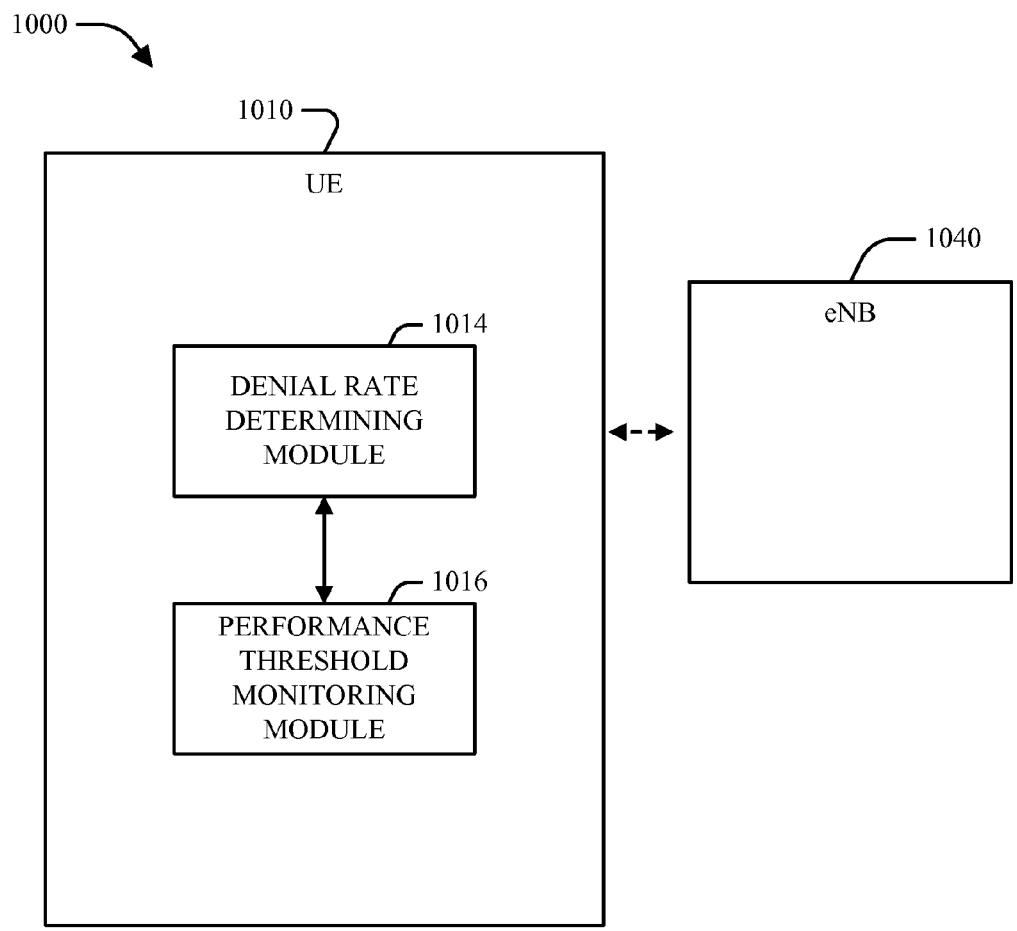
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, a denial rate determining module 1014, and a performance threshold monitoring module 1016 can be provided. The denial rate determining module 1014 determines denial rates of one or more communication resources of specific radio access technologies in the UE. The performance threshold monitoring module 1016 monitors the performance of the communication resources under the denial rates based on threshold performance levels. The various modules 1014-1016 may, in some examples, be implemented as part of a coexistence manager such as the CxM 640 of FIG. 6. The various modules 1014-1016 and others may be configured to implement the embodiments discussed herein.

A user equipment (UE) may have components to support communications with multiple radio access technologies, such as Bluetooth and Long Term Evolution (LTE). To support Bluetooth enhanced synchronous connection oriented (eSCO) operation (used in voice communications) simultaneously with operation of LTE communications, in certain circumstances, LTE uplink transmission attempts may be denied to avoid interference with Bluetooth downlink reception, thus allowing a Bluetooth communication resource (such as a radio) to receive packets without interference. Bluetooth packets are typically delivered within 3.75 milliseconds. Transmission denial rates for LTE to provide for successful Bluetooth communications are typically in the range of one in every three sub-frames, but that rate varies depending on transmission (Tx) power, Bluetooth timeline offset, and received signal strength indicator (RSSI).

An LTE evolved NodeB (eNB) may run an outer loop (OL) to control the LTE communication rate with various UEs. The eNB may track a packet error rate (PER) over a particular time period (for example a previous 100 ms) to ensure LTE communications with a UE do not fall below a desired PER due to dropped or improperly coded packets. The eNB may adjust an outer loop for mapping modulation coding scheme (MCS) signal to interference plus noise ratio (SINR) target to improve LTE throughput to a UE while maintaining a desired packet error rate. If the packet error rate is below a threshold (i.e., the channel is of higher quality than expected), the MCS is increased to improve throughput to take advantage of the higher channel quality. If the packet error rate exceeds a threshold (i.e., the channel is of lower quality than expected), the outer loop decreases the MCS to bring the packet error rate under the threshold and improve signal quality, though decreasing throughput. Under proper operation, the outer loop will reach a desired MCS to reduce error and improve throughput.

Denial of LTE communications by a coexistence manager (CxM) (to avoid interference with communications of another radio access technology such as Bluetooth) may increase the LTE error rate for the UE as a result of the denied communications. If the CxM is actively denying LTE communications with a rate higher than that used by the outer loop, the MCS assigned to the UE will continue to drop in an attempt to bring the LTE communications error with the UE below the outer loop threshold. The MCS may continue to drop in this manner until hitting the minimum MCS. This process is known as outer loop instability which results in a continuing drop in performance and throughput loss potentially resulting in a dropped call and other undesired results.

For example, take an LTE outer loop with a target packet error rate of 20% on a first transmission. If Bluetooth eSCO operation requires a CxM to deny 30% of LTE uplink transmissions to ensure proper eSCO operation, the Bluetooth denials alone will create an LTE error rate unacceptable to the outer loop target packet error rate. Thus, the MCS will be unable to lower sufficiently to achieve successful operation. The outer loop will never converge with the error rate and outer loop instability effects will be seen.

If, however, the outer loop targets a packet error rate of 40% on a first transmission, the LTE outer loop will drop the MCS to a point where the packet error rate is only 10%. The combined error rate from the coexistence manager Bluetooth denials (30%) and the MCS (10%) reaches the target packet error rate of 40%. In this situation, the MCS and coexistence manager denials will converge to achieve equilibrium and successful operation, thereby avoiding the outer loop instability effects.

Offered is a method to avoid the outer loop instability effects. If the LTE outer loop targets a first termination (meaning an LTE packet is decoded during the first transmission rather than in later re-transmissions), the outer loop instability effects illustrated above are difficult to resolve. If, however, the outer loop targets transmissions beyond the first transmission, the outer loop instability may be avoided by utilizing a higher acceptable packet error rate.

Typically, a UE does not know the targeted packet error of the eNB outer loop. In Hybrid Automatic Repeat Request (HARQ) situations with multiple transmissions, the outer loop may have differing target packet error rates for different transmission numbers. For example, an eNB may have a higher packet error rate for a first transmission and lower packet error rates for later transmissions. (LTE typically allows up to eight transmissions of the same packet. Earlier decoding results in a higher throughput rate.)

For second or later transmissions, an outer loop may be said to be targeting a packet error rate of x %. $y_1$ and $y_2$ represent the LTE denial rate on first and second terminations respectively and indicate the probability of error caused by packet denial. ("First termination" means LTE communications are to be decoded in the first transmission. "Second termination" means LTE communications are to be decoded in either the first or second transmission.) A y value of 1 indicates the particular transmission is always blocked. A y value of 0 indicates the particular transmission is always allowed. A y value of 0.5 indicates that 50% of the transmissions are blocked. z represents the LTE denial rate to create sufficient LTE transmissions gaps for successful Bluetooth eSCO operation. Using the values defined above, if Equation 1 is satisfied, the outer loop is stable and if Equation 2 is satisfied, Bluetooth eSCO operation will be successful:

$$y_1 \cdot y_2 \leq x \qquad \text{Equation 1}$$

$$\frac{(y_1 + y_1 y_2)}{(1 + y_1)} \geq z \qquad \text{Equation 2}$$

Gaps for Bluetooth communication are equal to the number of first transmissions denied plus the number of gaps created by second transmissions denied. Second transmissions only exist when first transmissions are denied and are only denied on certain occasions.

In the case of two transmissions, the total number of first transmissions is defined as $T_1$, so the total number of second transmissions $T_2$ is equal to the number of first transmissions denied. That is, $T_2 = T_1 \cdot y_1$. The total number of second transmissions denied is $T_2 \cdot y_z$ which is equal to $T_1 \cdot y_1 \cdot y_2$. The total gaps created is equal to $(T_1 \cdot y_1) + (T_1 \cdot y_1 \cdot y_2)$ and the total transmissions is equal to $(T_1 \cdot y_1) + T_1$. The fraction of gaps (total gaps divided by total transmissions) is $$\frac{(T_1 y_1 + T_1 y_1 y_2)}{(T_1 + T_1 y_1)}$$

which is equivalent to Equation 2 above. Values for $y_1$ and $y_2$ may be chosen to satisfy Equations 1 and 2 to avoid outer loop instability effects.

Because the UE typically does not know the targeted packet error rate x, the solution may assume a target second termination packet error rate of approximately 0%, meaning almost all LTE packets are successfully transmitted by the second transmission. If $z \leq 0.5$ (meaning successful Bluetooth operation requires denial of less than half of LTE transmissions), Equations 1 and 2 will always be satisfied, regardless of x. One successful solution is $y_1=1$ and $y_2=0$. That is, always deny the first transmission and always allow the second, thus creating almost a 50% duty cycle on LTE. In situations where x is not known, solutions such as the above can be used to avoid outer loop instability effects. In situations where x is known, $y_1$ and $y_2$ may be specifically set to avoid outer loop instability effects while also reducing LTE throughput loss.

When setting communications parameters for terminations beyond the second (for m number of transmissions), the following equations may be used:

$$\prod_{i=1}^{m} y_i \leq x \qquad \text{Equation 3}$$

$$\frac{\sum_{i=1}^{m} \prod_{j=1}^{i-1} y_j}{1 + \sum_{i=1}^{m-1} \prod_{j=1}^{i-1} y_j} \geq z \qquad \text{Equation 4}$$

Equations 3 and 4 may be adapted to the eNB outer loop. One method of doing so is to fix $y_2=0$ and adjust $y_1$ depending on the Bluetooth packet error rate until equilibrium is reached. Then, adapt $y_1$ using a loop where $y_1$ increases with some value $\Delta_{up}$ if the Bluetooth packet error rate is higher than a desired threshold and $y_1$ decreases with some value $\Delta_{down}$ if the Bluetooth packet error rate is lower than a desired threshold. Adapting $y_1$ to the eNB outer loop will reduce LTE throughput loss below the $y_1=1$, $y_2=0$ scenario.

Another approach is to boost priority for certain Bluetooth communications. In Bluetooth eSCO operation, packets have three opportunities for transmission before they are dropped. Depending on when a Bluetooth slot falls in the LTE timeline, further adjustments may improve performance. One addition to the previous methods for eSCO operation is to always allow the last Bluetooth communication opportunity to proceed if the first two attempts fail, regardless of the values of $y_1$ or $y_2$. This prioritization is called bin jumping on the last attempt (a bin is synonymous to priority and the jump here denotes priority boosting). The combination of $y_1=1$, $y_2=0$ and bin jumping on the last eSCO attempt achieves good results and ensures outer loop stability.

In another aspect, an eNB may take advantage of a UE operating in discontinuous transmission (DTX) mode to avoid outer loop instability effects. Discontinuous transmission describes an operation mode when a UE does not transmit data/control information at a time when the UE is expected to do so. If discontinuous transmission of a UE is detected by the eNB, then the eNB typically understands that UE did not transmit because the UE lost the Physical Downlink Control Channel (PDCCH). In this case the eNB may boost the power on the PDCCH to ensure reception of the PDCCH signal by the UE. In one aspect of the present disclosure, the eNB may use the same discontinuous transmission detection to prevent outer loop instability effects. In one aspect, the eNB detects that the UE missed a Physical Uplink Shared Channel (PUSCH) transmission on an expected subframe. The eNB then does not update the uplink (UL) rate control loop (i.e., outer loop). The outer loop still converges with the UE operating conditions, thereby avoiding uplink outer loop instability effects.

The techniques described herein may also be used to avoid downlink outer loop instability effects. If an LTE downlink error rate does not match an error rate targeted by a downlink rate control loop (i.e., downlink outer loop), the downlink MCS will continue to decrease causing outer loop instability effects. A number of factors may cause a high error rate on LTE downlink such as a transmitting interferer (for example, Bluetooth eSCO), compromised LTE received sub-frames, etc. Discontinuous transmission detection discussed above may be applied to avoid downlink outer loop instability effects. In one aspect, if the eNB detects, in a sub-frame, that an expected ACK/NACK for a previous Physical Downlink Shared Channel (PDSCH) transmission was not sent by the UE, then the eNB will not update the downlink rate control loop (i.e., outer loop). The outer loop stills converges with the UE operating conditions, thereby avoiding downlink outer loop instability effects.

Figure 11:
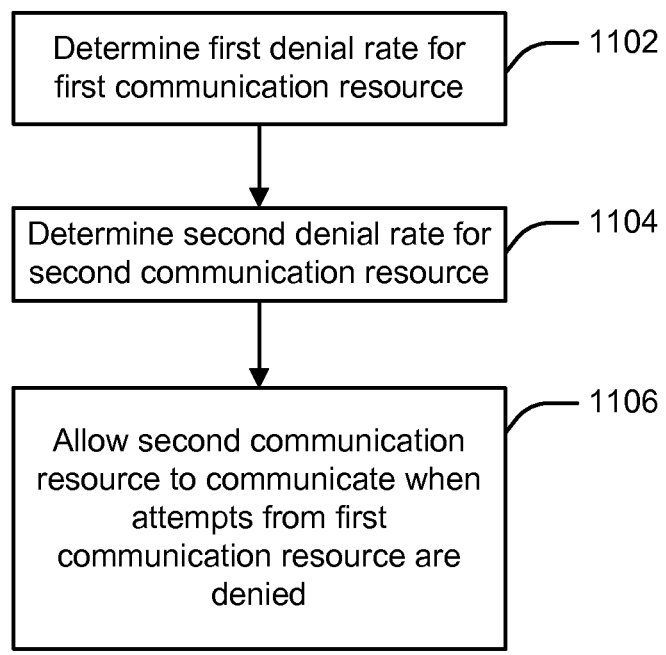
FIG. 11 is a flow diagram illustrating wireless communications according to one aspect of the present disclosure.

As shown in FIG. 11 a UE may determine a first denial rate for denying first communication attempts of a packet using a first communication resource, as shown in block 1102. The UE may determine a second denial rate for denying second communication attempts of the packet using the first communication resource, as shown in block 1104. The UE may allow a second communication resource to communicate when communication attempts from the first communication resource are denied. The first denial rate and second denial rate are determined to achieve a first threshold level of performance of the first communication resource and a second threshold level of performance of the second communication resource.

Figure 12:
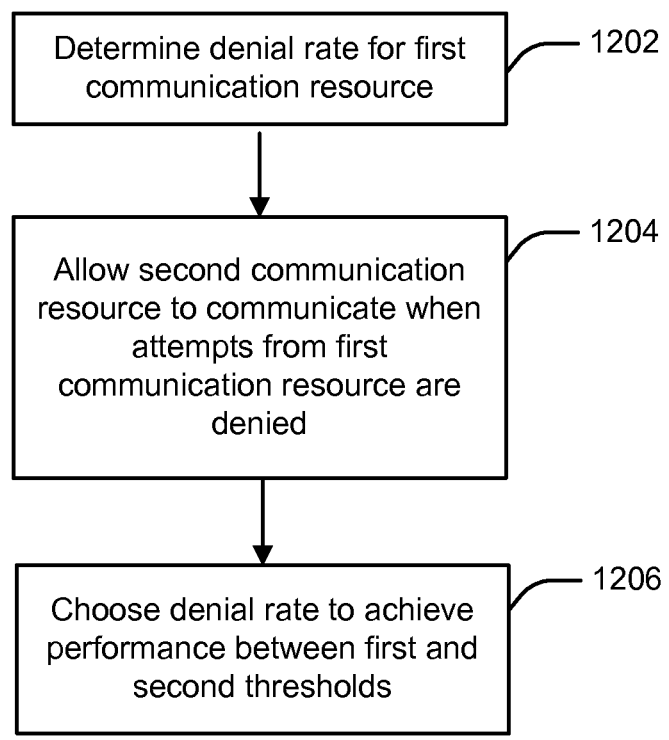
FIG. 12 is a flow diagram illustrating wireless communications according to one aspect of the present disclosure.

As shown in FIG. 12, a UE may determine a denial rate for denying first communication attempts of a packet using a first communication resource, as shown in block 1202. The UE may allow a second communication resource to communicate when communication attempts from the first communication resource are denied, as shown in block 1204. The UE may choose the denial rate to achieve less than a first threshold level of performance of the first communication resource and greater than a second threshold level of performance of the second communication resource, as shown in block 1206.

A UE may comprise means for determining a first denial rate for denying first communication attempts of a packet using a first communication resource, means for determining a second denial rate for denying second communication attempts of the packet using the first communication resource, and means for allowing a second communication resource to communicate when communication attempts from the first communication resource are denied. The first denial rate and second denial rate are determined to achieve a first threshold level of performance of the first communication resource and a second threshold level of performance of the second communication resource. In one aspect, the aforementioned means for may be the denial rate determining module 1014, the performance threshold monitoring module 1016, the receive data processor 260, the transmit data processor 238, the coexistence manager 640, the memory 272, and/or the processor 270 configured to perform the functions recited by the aforementioned means. In another aspect, the aforementioned means may be a module or any apparatus configured to perform the functions recited by the aforementioned means.

A UE may comprise means for determining a denial rate for denying first communication attempts of a packet using a first communication resource, means for allowing a second communication resource to communicate when communication attempts from the first communication resource are denied, and means for choosing the denial rate to achieve less than a first threshold level of performance of the first communication resource and greater than a second threshold level of performance of the second communication resource. In one aspect, the aforementioned means for may be the denial rate determining module 1014, the performance threshold monitoring module 1016, the receive data processor 260, the transmit data processor 238, the coexistence manager 640, the memory 272, and/or the processor 270 configured to perform the functions recited by the aforementioned means. In another aspect, the aforementioned means may be a module or any apparatus configured to perform the functions recited by the aforementioned means.

Figure 13:
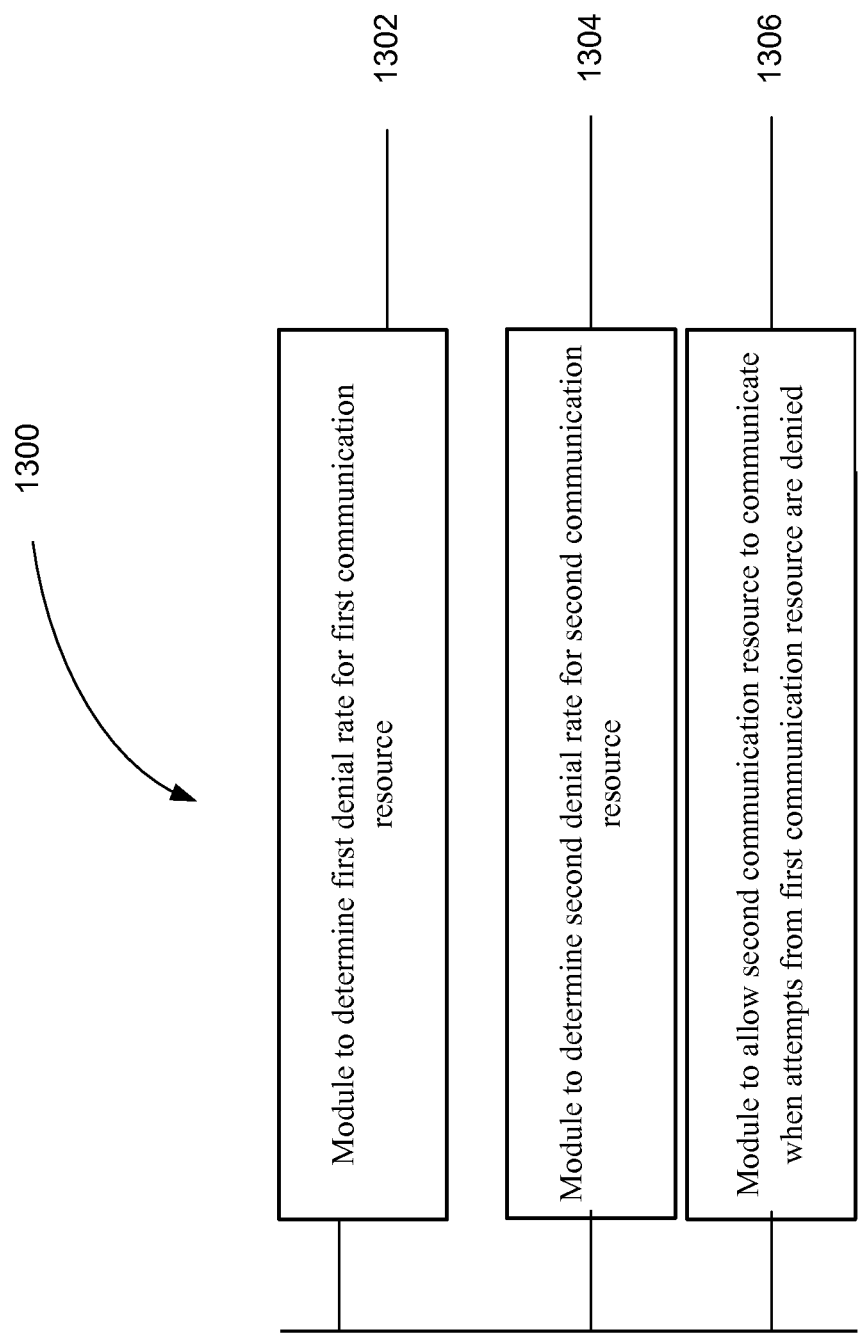
FIG. 13 is a block diagram illustrating wireless communications according to one aspect of the present disclosure.

FIG. 13 shows a design of an apparatus 1300 for a UE. The apparatus 1300 includes a module 1302 to determine a first denial rate for denying first communication attempts of a packet using a first communication resource. The apparatus also includes a module 1304 to determine a second denial rate for denying second communication attempts of the packet using the first communication resource. The apparatus also includes a module 1306 to allow a second communication resource to communicate when communication attempts from the first communication resource are denied. The first denial rate and second denial rate are determined to achieve a first threshold level of performance of the first communication resource and a second threshold level of performance of the second communication resource. The modules in FIG. 13 may be processors, electronics devices, hardware devices, electronics components, logical circuits, memories, software codes, firmware codes, etc., or any combination thereof.

Figure 14:
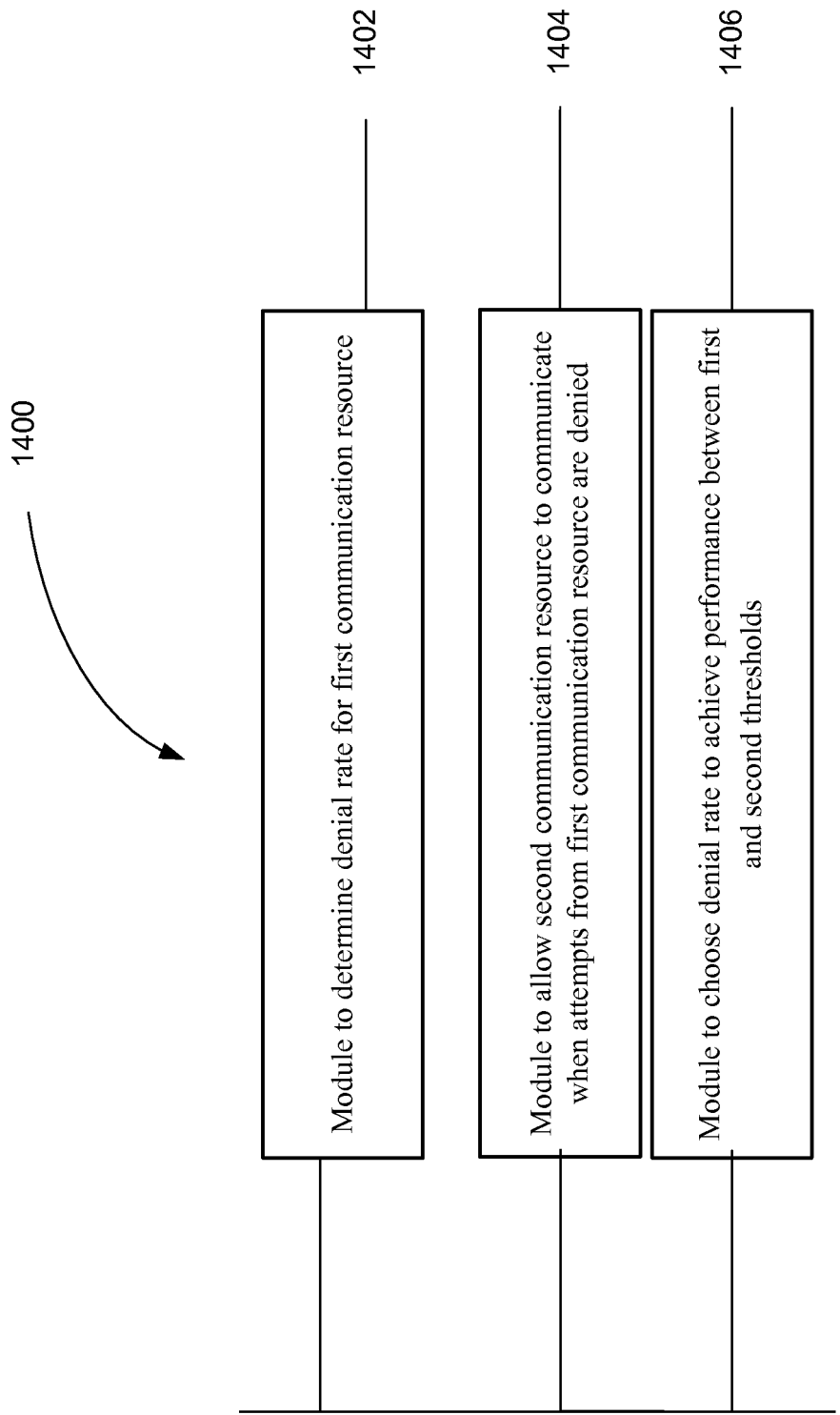
FIG. 14 is a block diagram illustrating wireless communications according to one aspect of the present disclosure.

FIG. 14 shows a design of an apparatus 1400 for a UE. The apparatus 1400 includes a module 1402 to determine a denial rate for denying first communication attempts of a packet using a first communication resource. The apparatus also includes module 1404 to allow a second communication resource to communicate when communication attempts from the first communication resource are denied. The apparatus also includes module 1406 to choose the denial rate to achieve less than a first threshold level of performance of the first communication resource and greater than a second threshold level of performance of the second communication resource.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communication, comprising:
   determining a first threshold level of performance of a cellular system communication resources, the first threshold level of performance being an outer loop target error rate;
   determining a second threshold level of performance of an Industrial Scientific and Medical (ISM) band communication resource, the second threshold level of performance being a desired gap rate;
   determining a first denial rate for denying first communication attempts of a packet using the cellular system communication resource and determining a second denial rate for denying second communication attempts of the packet using the cellular system communication resource, in which the first denial rate and second denial rate are based on the first threshold level of performance and the second threshold level of performance; and
   allowing the ISM band communication resource to communicate when communication attempts from the cellular system communication resource are denied.

2. The method of claim 1 in which determining the first denial rate and second denial rate comprise:
   setting a value for the second denial rate; and
   based on the set value for the second denial rate, adjusting the first denial rate to achieve the second threshold level.

3. The method of claim 1 in which determining the first denial rate and second denial rate comprise denying all first communication attempts of the packet and allowing all second communication attempts of the packet.

4. The method of claim 1 further comprising prioritizing final communication attempts by the ISM band communication resource.

5. The method of claim 1 in which the ISM band communication resource comprises a Bluetooth modem and the cellular system communication resource comprises an LTE (Long Term Evolution) modem.

6. The method of claim 1, further comprising:
   determining at least one additional denial rate for denying at least one additional communication attempt of a packet using the cellular system communication resource; and
   allowing the ISM band communication resource to communicate when communication attempts from the cellular system communication resource are denied, wherein:
   the first denial rate, the second denial rate and the at least one additional denial rate being determined to achieve the first threshold level of performance of the cellular system communication resource, and the second threshold level of performance of the ISM band communication resource.

7. A method for wireless communication, comprising:
   determining a first threshold level of performance of a cellular system communication resources, the first threshold level of performance being an outer loop target error rate;
   determining a second threshold level of performance of an Industrial Scientific and Medical (ISM) band communication resource, the second threshold level of performance being a desired gap rate;
   determining a denial rate for denying first communication attempts of a packet using the cellular system communication resource, in which the denial rate is determined to achieve less than the first threshold level of performance for the cellular communication resource and greater than the second threshold level of performance for the ISM band communication resource; and
   allowing the ISM band communication resource to communicate when communication attempts from the cellular system communication resource are denied.

8. An apparatus for wireless communications, comprising:
means for determining a first threshold level of performance of a cellular system communication resources, the first threshold level of performance being an outer loop target error rate;
means for determining a second threshold level of performance of an Industrial Scientific and Medical (ISM) band communication resource, the second threshold level of performance being a desired gap rate;
means for determining a first denial rate for denying first communication attempts of a packet using the cellular system communication resource and means for determining a second denial rate for denying second communication attempts of the packet using the cellular system communication resource, in which the first denial rate and second denial rate are based on the first threshold level of performance and the second threshold level of performance; and
means for allowing the ISM band communication resource to communicate when communication attempts from the cellular system communication resource are denied, the first denial rate and second denial rate being determined to achieve a first threshold level of performance of the cellular system communication resource and a second threshold level of performance of the ISM band communication resource.

9. An apparatus for wireless communications, comprising:
means for determining a first threshold level of performance of a cellular system communication resources, the first threshold level of performance being an outer loop target error rate;
means for determining a second threshold level of performance of an Industrial Scientific and Medical (ISM) band communication resource, the second threshold level of performance being a desired gap rate;
means for determining a denial rate for denying first communication attempts of a packet using the cellular system communication resource, in which the denial rate is determined to achieve less than the first threshold level of performance for the cellular communication resource and greater than the second threshold level of performance for the ISM band communication resource; and
means for allowing the ISM band communication resource to communicate when communication attempts from the cellular system communication resource are denied.

10. A computer program product configured for wireless communication, the computer program product comprising:
a non-transitory computer-readable medium having non-transitory program code recorded thereon, the non-transitory program code comprising:
program code to determine a first threshold level of performance of a cellular system communication resources, the first threshold level of performance being an outer loop target error rate;
program code to determine a second threshold level of performance of an Industrial Scientific and Medical (ISM) band communication resource, the second threshold level of performance being a desired gap rate;
program code to determine a first denial rate for denying first communication attempts of a packet using the cellular system communication resource and program code to determine a second denial rate for denying second communication attempts of the packet using the cellular system communication resource, in which the first denial rate and second denial rate are based on the first threshold level of performance and the second threshold level of performance; and
program code to allow the ISM band communication resource to communicate when communication attempts from the cellular system communication resource are denied.

11. A computer program product configured for wireless communication, the computer program product comprising:
a non-transitory computer-readable medium having non-transitory program code recorded thereon, the non-transitory program code comprising:
program code to determine a first threshold level of performance of a cellular system communication resources, the first threshold level of performance being an outer loop target error rate;
program code to determine a second threshold level of performance of an Industrial Scientific and Medical (ISM) band communication resource, the second threshold level of performance being a desired gap rate;
program code to determine a denial rate for denying first communication attempts of a packet using the cellular system communication resource, in which the denial rate is determined to achieve less than the first threshold level of performance for the cellular communication resource and greater than the second threshold level of performance for the ISM band communication resource; and
program code to allow the ISM band communication resource to communicate when communication attempts from the cellular system communication resource are denied.

12. An apparatus configured for wireless communication, the apparatus comprising:
a memory; and
at least one processor coupled to the memory, the at least one processor being configured:
to determine a first threshold level of performance of a cellular system communication resources, the first threshold level of performance being an outer loop target error rate;
to determine a second threshold level of performance of an Industrial Scientific and Medical (ISM) band communication resource, the second threshold level of performance being a desired gap rate;
to determine a first denial rate for denying first communication attempts of a packet using the cellular system communication resource and to determine a second denial rate for denying second communication attempts of the packet using the cellular system communication resource, in which the first denial rate and second denial rate are based on the first threshold level of performance and the second threshold level of performance; and
to allow the ISM band communication resource to communicate when communication attempts from the cellular system communication resource are denied.

13. The apparatus of claim 12 in which the at least one processor configured to determine the first denial rate and second denial rate comprises the at least one processor configured to:
set a value for the second denial rate; and
based on the set value for the second denial rate, adjust the first denial rate to achieve the second threshold level.

14. The apparatus of claim 12 in which the at least one processor is further configured to deny all first communication attempts of the packet and allow all second communication attempts of the packet.

15. The apparatus of claim 12 in which the at least one processor is further configured to prioritize final communication attempts by the ISM band communication resource.

16. The apparatus of claim 12 in which the ISM band communication resource comprises a Bluetooth modem and the cellular system communication resource comprises an LTE (Long Term Evolution) modem.

17. The apparatus of claim 12, in which the at least one processor is further configured to:
   determine at least one additional denial rate for denying at least one additional communication attempt of a packet using the cellular system communication resource; and
   allow the second communication resource to communicate when communication attempts from the cellular system communication resource are denied, wherein
   the first denial rate, the second denial rate and the at least one additional denial rate being determined to achieve the first threshold level of performance of the cellular system communication resource, and the second threshold level of performance of the ISM band communication resource.

18. An apparatus configured for wireless communication, the apparatus comprising:
   a memory; and
   at least one processor coupled to the memory, the at least one processor being configured:
      to determine a first threshold level of performance of a cellular system communication resources, the first threshold level of performance being an outer loop target error rate;
      to determine a second threshold level of performance of an Industrial Scientific and Medical (ISM) band communication resource, the second threshold level of performance being a desired gap rate;
      to determine a denial rate for denying first communication attempts of a packet using the cellular system communication resource, in which the denial rate is determined to achieve less than the first threshold level of performance for the cellular communication resource and greater than the second threshold level of performance for the ISM band communication resource; and
      to allow the ISM band communication resource to communicate when communication attempts from the cellular system communication resource are denied.

19. The method of claim 1, further comprising:
   measuring at least one of the cellular system communication resource and ISM band communication resource to determine the first denial rate and second denial rate based on the first threshold level of performance and second threshold level of performance.

20. The apparatus of claim 8, further comprising:
   means for measuring at least one of the cellular system communication resource and ISM band communication resource to determine the first denial rate and second denial rate based on the first threshold level of performance and second threshold level of performance.

21. The computer program product of claim 10, in which the non-transitory program code further comprises:
   program code to measure at least one of the cellular system communication resource and ISM band communication resource to determine the first denial rate and second denial rate based on the first threshold level of performance and second threshold level of performance.

22. The apparatus of claim 12, in which the at least one processor is further configured:
   to measure at least one of the cellular system communication resource and ISM band communication resource to determine the first denial rate and second denial rate based on the first threshold level of performance and second threshold level of performance.

* * * * *